United States Patent [19]

Ridout

[11] 4,345,360
[45] Aug. 24, 1982

[54] METHOD OF FORMING A METAL WHEEL
[75] Inventor: Robert A. Ridout, McHenry, Ill.
[73] Assignee: Kaiser Aluminum & Chemical Corporation, Oakland, Calif.
[21] Appl. No.: 168,839
[22] Filed: Jul. 10, 1980
[51] Int. Cl.³ .............................................. B21D 53/30
[52] U.S. Cl. ................................ 29/159.01; 301/63 R; 72/256
[58] Field of Search ................. 72/254, 255, 256, 368; 29/159 R, 159.01, 159.1; 301/63 R, 64 SD

[56] References Cited

U.S. PATENT DOCUMENTS

| | | | |
|---|---|---|---|
| 1,979,815 | 11/1934 | Wagenhorst | 29/159.01 |
| 2,716,805 | 9/1955 | Reed | 72/256 |
| 4,256,348 | 3/1981 | Lester et al. | 301/63 R |

FOREIGN PATENT DOCUMENTS 490754  8/1938  United Kingdom ............... 29/159.1

Primary Examiner—Lowell A. Larson
Attorney, Agent, or Firm—Paul E. Calrow; Malcolm McQuarrie

[57] ABSTRACT

A one-piece metal wheel, preferably of aluminum, for example a wheel suitable for use on automotive and truck vehicles, is formed by (1) extruding a straight section comprising a first portion in the configuration of the wheel rim and an integral straight web portion, (2) cutting this extrusion to the appropriate length and forming it into a circular shape, (3) joining, for example by pressure welding the ends of the extrusion to form a continuous loop, and (4) deforming the web portion of the extrusion to form the center or disc of the wheel.

9 Claims, 7 Drawing Figures

METHOD OF FORMING A METAL WHEEL

BACKGROUND OF THE INVENTION

This invention concerns a method of forming a metal wheel, particularly a one-piece metal wheel suitable for use on automotive and truck vehicles.

The vast majority of automotive vehicle wheels are presently made of steel, and conventionally are made by cutting and welding a piece of steel to form a circular tube and then roll-forming this tube to the configuration of the wheel rim. A separate piece of steel is formed to the shape of the disc or center of the wheel and then welded to the rim. Such steel wheels are strong and relatively inexpensive to make.

However, in recent years there has been a determined effort to reduce the weight of vehicles, particularly automobiles. To this end, the use of aluminum in place of steel to make vehicle wheels is very attractive because of the much lower weight per unit volume of aluminum as compared to steel.

It is known to make two-piece wheels of aluminum, first forming the rim and then welding it to the disc or center of the wheel; see U.S. Pat. No. 4,185,370. It is also known to extrude the rim portion of a two-piece wheel; (see U.S. Pat. Nos. 2,034,360 and 3,172,787). However, the welding operation can cause problems: not only must aluminum be welded very carefully, but the metallurgical, particularly the strength, characteristics of the metal in the weld are generally inferior to that of aluminum which has not been subjected to the high heat inherent in the welding operation. In other words, the metal in the weld is generally not as strong as the metal in the other parts of the wheel, leading to a point of potential weakness in the wheel.

It is also known to form one-piece aluminum wheels by casting the complete wheel and also by forging the wheel to shape (see British Pat. Nos. 971,258 and 971,259), or by forging and spinning portions of the wheel to shape (see U.S. Pat. Nos. 4,048,828 and 4,055,068). However, the main problem with casting or forging one-piece aluminum wheels is that, in order to achieve adequately strong wheels, it is necessary to use relatively thick sections of aluminum (as compared to a steel wheel, for example) and thus the weight advantage of using aluminum is more or less totally lost.

The method of the present invention permits the fabrication of a one-piece aluminum wheel using a minimum amount of metal. In other words, portions of the wheel which must be stronger can be formed to a thicker section and portions which require less strength can be formed to a thinner section. Furthermore, the wheel produced according to the method of this invention is free of the zones of relative weakness associated with hot welded joints.

SUMMARY OF THE INVENTION

It has now been found, according to this invention, that a metal wheel can be formed from a single piece of metal by:

(a) forming a piece of metal having a first portion with a cross section substantially conforming to the cross section of the rim of the wheel to be formed, the larger cross sectional dimension of the first portion being substantially greater than the thickness of the first portion, the first portion having a first surface corresponding to the outer surface of the wheel to be formed and a second, opposed surface corresponding to the inner side of the wheel to be formed, and an integral second portion constituting a plane section attached to the second surface of the first portion and lying generally parallel to the larger cross sectional dimension of the first portion;

(b) cutting said metal piece to a length approximately equal to the circumference of the wheel to be formed from it;

(c) bending said cut piece into a circular shape with said first surface on the outside of the circle and said second surface on the inside, whereby said attached second, planar portion is formed into a cylinder concentric with the bent, circular first portion;

(d) joining the opposed ends of said bent piece; and (e) deforming said attached, now cylindrical, second portion to form an integrally attached disc for the wheel.

DETAILED DESCRIPTION

Any metal can be used to make a wheel according to the present invention, but the method is preferably used with an extrudable aluminum alloy, for example one of the 6000 series of alloys (magnesium-silicon alloys), for example 6061 alloy. While any method of forming the initial shape, for example rolling, can be used, it is preferred that the piece be extruded, and the invention will be described using extrusion.

Figure 1:
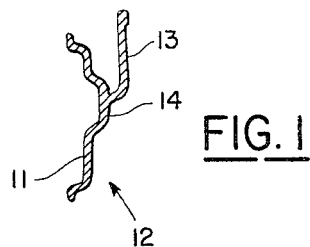
FIG. 1 is a cross-sectional view of an initial shape used in this invention.

The alloy chosen will be extruded in a manner well known to those skilled in the art. The first or main portion 11 of the extrusion 12 will have a cross-section conforming substantially to that desired in the wheel rim and thus will have a width dimension (extending from one rim bead to the other) approximately equal to the width of the completed rim. Although the extrusion of FIG. 1 is shown with a substantially uniform thickness, it will be evident that portions of the rim can be thickened if desired for reasons of strength.

Attached to main portion 11 of extrusion 12 is a web portion 13 which lies generally in a direction parallel to the main central section 14 of portion 11. Thus, when the extrusion is bent into a circular shape, web 13 forms a cylinder attached to main portion 11, which will form the rim of the wheel. Again, the cross-section of web 13 need not be uniform, but may, for example, be tapered, if desired. Similarly, the point of attachment of web portion 13 to main portion 11 can be varied in accordance with the design of the wheel to be made. Extrusion 12 will be made in a length of at least equal to the circumference of one wheel, but generally it will prove more feasible to extrude it in longer lengths, a multiple of the circumference of a single wheel, and cut pieces to the desired length.

After being subjected to the usual straightening process (by stretching), the extrusion will be cut to the circumferential length of one wheel and curved so that the two ends of the extrusion are substantially abutting. These two ends will then be joined by any suitable method, welding being preferred. Although conventional molten metal welding or electron beam welding can be used, pressure welding, particularly at ambient temperature, is preferred. Because heat is not used, ambient temperature pressure welding results in a much stronger joint than would be achieved with a molten metal welding operation. In fact, it has been found that the metal in cold pressure welded joints has substantially as good properties (strength, elongation, etc.) as the metal which has not been subjected to the cold welding operation.

Figures 2A, 2B, 2C:
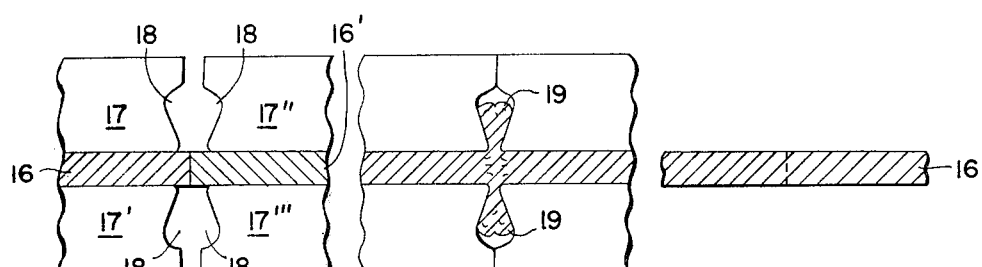
FIG. 2 is a schematic representation of the cold butt welding of two pieces of metal.

Cold pressure welding is a well known process and need not be explained in any great detail here. FIG. 2 is a schematic illustration of the cold butt welding of two flat pieces of metal 16 and 16'. Pieces 16 and 16' are gripped by jaws 17 and 17' and by jaws 17" and 17"', respectively. After pieces 16 and 16' have been firmly gripped in jaws 16, they are forced together under very high pressure, for example 150,000 psi, by the movement of jaws 17 and 17' toward 17" and 17"'. During this operation, as illustrated in FIG. 2b, excess metal at the joint is forced into jaw recesses 18 and the two pieces 16 and 16' become a substantially continuous piece of metal. The flash 19 thus formed is removed, resulting in a smooth piece of metal of continuous cross section, as shown in FIG. 2c.

It will be evident to those skilled in the art that somewhat more complicated gripping jaws than those shown in FIG. 2 will be necessary in the case of cold welding an extrusion to make a wheel according to the present invention, but the design of such apparatus, which forms no part of the present invention, is well within the skill of those versed in the art.

It will be understood that, as is well known in this art, the cold welding cycle can be repeated one or more times to effect an efficient weld.

Figure 3:
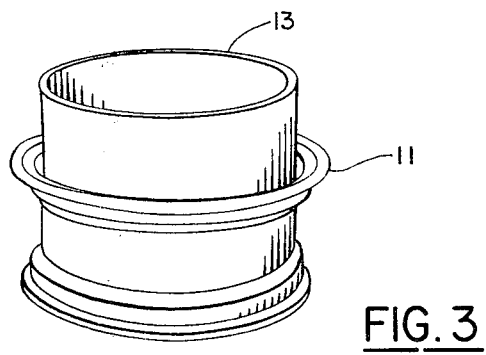
FIG. 3 is a perspective view of a wheel made according to this invention at an intermediate stage in its production.

FIG. 3 gives a perspective view of a wheel made according to this invention at this stage of the operation. The rim of the wheel, formed from main portion 11 of extrusion 12, is readily recognizable, while web portion 13 now forms a cylindrical section.

Figure 4:
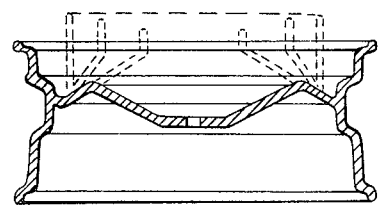
FIG. 4 is a cross-sectional view of a wheel made according to this invention and illustrating the deformation to form the disc or center of the wheel.

This cylinder formed from web 13 is now deformed so that, instead of being a vertical cylinder, it forms a more or less flat disc which is the center or disc of the wheel. FIG. 4 shows the finished wheel in cross section and, in dotted section, several stages of the deformation of the cylinder formed from web 13. This deformation can be carried out by any of several well known processes, for example, by spinning. However, it has been found that the deformation is most advantageously done by pressing the cylinder and its subsequent configurations in a series, for example 7 or 8, top and bottom dies. The top die forces the cylinder down to conform with the bottom die in each stage, the top and bottom dies in successive stages imparting greater deformation to the cylinder until it finally forms the disc or center of the wheel.

Figure 5:
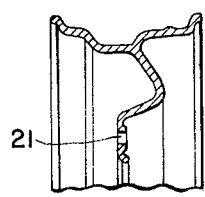
FIG. 5 is a cross-sectional view of an alternate configuration of a wheel.

It will be evident that other configurations of both the rim and the disc of the wheel can be made. For example, the web could take the configuration shown in cross section in FIG. 5. It will be noted in this figure that the disc portion of the wheel has had imparted to it different thicknesses at different points, in particular the area of the bolt holes (21) is substantially thicker than other portions.

It is one of the advantages of the present invention that by it one can form a one-piece metal wheel which has the optimum thickness of metal in different portions to achieve the most efficient use of the metal and thus achieve a wheel of minimum weight for the necessary strength.

It will be appreciated that, in addition to the various engineering configurations of wheels which can be made by the process of this invention, the process also provides an opportunity for varied styling of wheels made, for example by means of variations in the extruded section and in the deforming part of the process.

While the invention has been described, and is perhaps most useful, in connection with vehicle wheels, it will be apparent that it can be used to make other types of wheels, for example pulleys.

I claim:

1. Method of forming a metal wheel having a rim and an integral disc from a single piece of metal, comprising:
    (a) forming by extrusion a piece of metal having a first portion with a cross section substantially conforming to the cross section of the rim of the wheel to be formed, the cross section of said first portion having a width dimension and a thickness dimension, said width cross sectional dimension of the first portion being substantially greater than said thickness cross sectional dimension of the first portion, the first portion having a first surface corresponding to the outer side of the wheel to be formed and a second, opposed surface corresponding to the inner side of the wheel to be formed, and an integral second portion constituting a plane section attached to the second surface of the first portion and lying generally parallel to the width cross sectional dimension of the first portion;
    (b) cutting said metal piece to a length approximately equal to the circumference of the wheel to be formed from it;
    (c) bending said cut piece into a circular shape with said first surface on the outside of the circle and said second surface on the inside, whereby said attached second, planar portion is formed into a cylinder concentric with the bent, circular first portion;
    (d) joining the opposite ends of said bent piece; and
    (e) deforming said attached, now cylindrical, second portion to form an integrally attached disc for the wheel.

2. Method according to claim 1 wherein the joining of step (d) is by welding.

3. Method according to claim 2 wherein the welding is pressure welding.

4. Method according to claim 3 wherein the pressure welding is carried out at ambient temperature.

5. Method according to claim 1 wherein the deformation in step (e) is by press forming.

6. Method according to claim 1 wherein the deformation in step (e) is by spinning.

7. Method according to claim 1, 2, 3, 4, 5, 9 or 6 wherein the metal used is aluminum.

8. Method according to claim 7 wherein the aluminum is a 6000 series aluminum alloy.

9. Method according to claim 8 wherein the alloy is 6061 alloy.

* * * * *

UNITED STATES PATENT AND TRADEMARK OFFICE
CERTIFICATE OF CORRECTION

PATENT NO. : 4,345,360

DATED : August 24, 1982

INVENTOR(S) : Robert A. Ridout

It is certified that error appears in the above-identified patent and that said Letters Patent are hereby corrected as shown below:

Column 2, line 66, "length of at least" should be --length at least--

Column 3, line 25, "jaws 16" should be --jaws 17--

Signed and Sealed this

Thirteenth Day of December 1983

[SEAL]

Attest:

GERALD J. MOSSINGHOFF

Attesting Officer

Commissioner of Patents and Trademarks